(12) United States Patent
Clement et al.

(10) Patent No.: US 7,544,217 B2
(45) Date of Patent: Jun. 9, 2009

(54) DYE MIXTURES

(75) Inventors: Antoine Clement, Marly (CH); Alfons Arquint, Basel (CH); Urs Lauk, Zurich (CH)

(73) Assignee: Huntsman International LLC, The Woodlands, TX (US)

( * ) Notice: Subject to any disclaimer, the term of this patent is extended or adjusted under 35 U.S.C. 154(b) by 35 days.

(21) Appl. No.: 11/914,256

(22) PCT Filed: May 3, 2006

(86) PCT No.: PCT/EP2006/062018

§ 371 (c)(1),
(2), (4) Date: Nov. 13, 2007

(87) PCT Pub. No.: WO2006/120148

PCT Pub. Date: Nov. 16, 2006

(65) Prior Publication Data

US 2008/0263789 A1    Oct. 30, 2008

(30) Foreign Application Priority Data

May 13, 2005    (EP) .................................. 05104029

(51) Int. Cl.
*A61Q 5/10* (2006.01)
*C09B 56/12* (2006.01)

(52) U.S. Cl. .................... 8/638; 8/639; 8/643; 534/655

(58) Field of Classification Search .................. 8/638, 8/643; 534/655
See application file for complete search history.

(56) References Cited

U.S. PATENT DOCUMENTS

| 3,640,674 A | 2/1972 | Berrie et al. |
| 4,709,019 A | 11/1987 | Rolf et al. |
| 5,403,363 A | 4/1995 | Loeffler et al. |

FOREIGN PATENT DOCUMENTS

| DE | 4308694 A | * 9/1983 |
| EP | 0043937 | 1/1982 |
| EP | 0601439 | 6/1994 |
| JP | 4173872 | 6/1992 |

OTHER PUBLICATIONS

STIC Search Report dated Feb. 9, 2009.*
English Abstract of the Patent No. DE 3208694 A (1983).*
Database WPI, Section Ch, Week 199231, Derwent Publications Ltd., London, GB; AN 1992-255769 XP002363378.

* cited by examiner

*Primary Examiner*—Eisa B Elhilo

(57) ABSTRACT

The present invention relates to dye mixtures comprising (A) from 20 to 80% by weight of one or more compounds of formula (1)

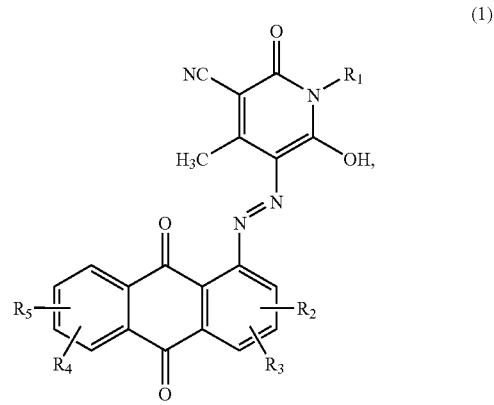

(1)

wherein $R_1$ is $C_1$-$C_{12}$alkyl, or $C_1$-$C_2$alkyl interrupted by one or more oxygen atoms or —COO-groups and $R_2$, $R_3$, $R_4$ and $R_5$, each independently of the others, is hydrogen, $C_1$-$C_{12}$alkyl, chlorine, bromine, hydroxy or amino and
(B) from 20 to 80% by weight of at least one further yellow disperse dye the sum of components (A)+(B) being 100% by weight, and to the use of those dye mixtures in the dyeing or printing of semi-synthetic or synthetic hydrophobic fiber materials.

14 Claims, No Drawings

DYE MIXTURES

CROSS REFERENCE TO RELATED APPLICATIONS

This application is the National Phase of International Application PCT/EP2006/062018 filed May 3, 2006 which designated the U.S. and which claims priority to European Patent Application (EP) 05104029.3 filed May 13, 2005. The noted applications are incorporated herein by reference.

The present invention relates to mixtures of anthraquinone-azo dyes and to the use thereof in the dyeing or printing of semi-synthetic or synthetic hydrophobic fibre materials.

Anthraquinone-azo dyes which, by virtue of their properties of fastness to light and to migration, can be used in a variety of pigment applications, such as, for example, in paints and in the colouring of paper and plastics, are described in EP-A 43 937.

Azo dyes based on 4-methyl-5-cyano-6-hydroxy-2-pyridones as coupling component are proposed in U.S. Pat. No. 3,640,674 for the dyeing of synthetic textile materials.

EP-A 0 601 439 discloses dye mixtures comprising at least 6 isochromatic azo dyes prepared from substituted 3-cyano-4-methylpyridines and diazo components from the aniline, aminothiophene, aminothiazole, aminoisothiazole or aminobenzisothiazole series, which exhibit virtually no temperature-dependency of the absorption behaviour and have a low tendency towards recrystallisation in dispersed form.

The anthraquinone-azo pigments based on 4-methyl-5-cyano-6-hydroxy-2-pyridones as coupling component described in U.S. Pat. No. 4,709,019 exhibit a high degree of fastness to light and to migration and are suitable especially for the colouring of plastics.

It has now, surprisingly, been found that specific mixtures comprising at least one anthraquinone-azo dye are likewise suitable for dyeing polyester fibres in the exhaust method. The dyeings obtained are distinguished by a high degree of high-temperature light fastness and by high tinctorial strength.

The present invention accordingly relates to a dye mixture comprising (A) from 20 to 80% by weight, preferably from 25 to 60% by weight, especially from 30 to 50% by weight, of one or more compounds of formula (1)

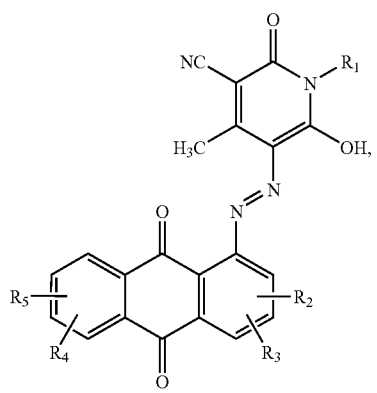

wherein $R_1$ is $C_1$-$C_{12}$alkyl, or $C_2$-$C_{12}$alkyl interrupted by one or more oxygen atoms and/or —COO-groups and $R_2$, $R_3$, $R_4$ and $R_5$, each independently of the others, is hydrogen, $C_1$-$C_{12}$alkyl, chlorine, bromine, hydroxy or amino and (B) from 20 to 80% by weight, preferably from 25 to 60% by weight, especially from 30 to 50% by weight, of at least one compound of formulae (2)-(12)

(2)

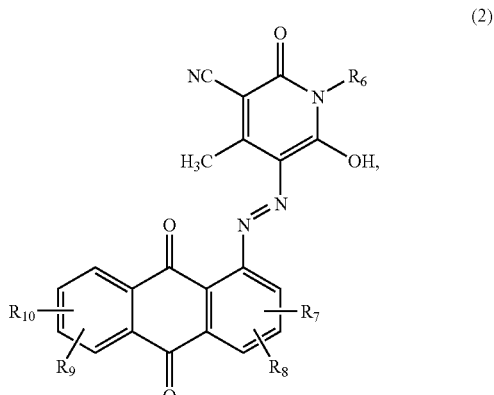

(3)

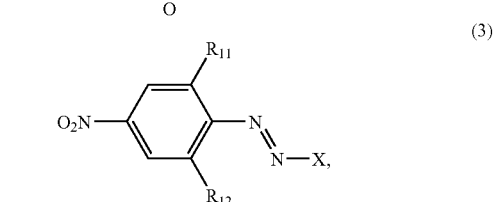

(4)

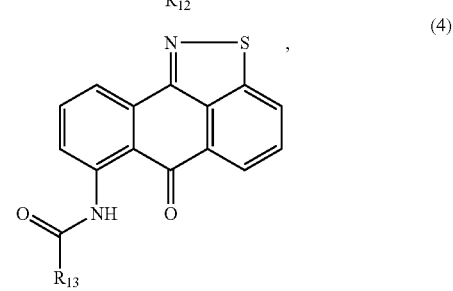

(5)

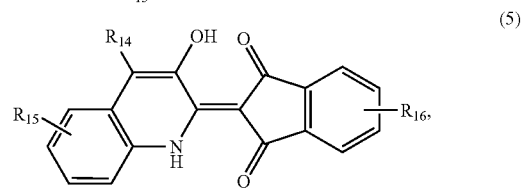

(6)

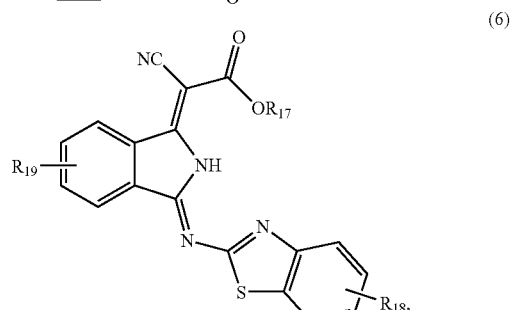

(7)

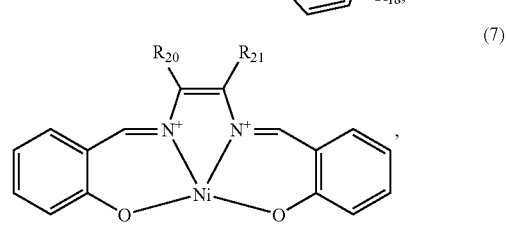

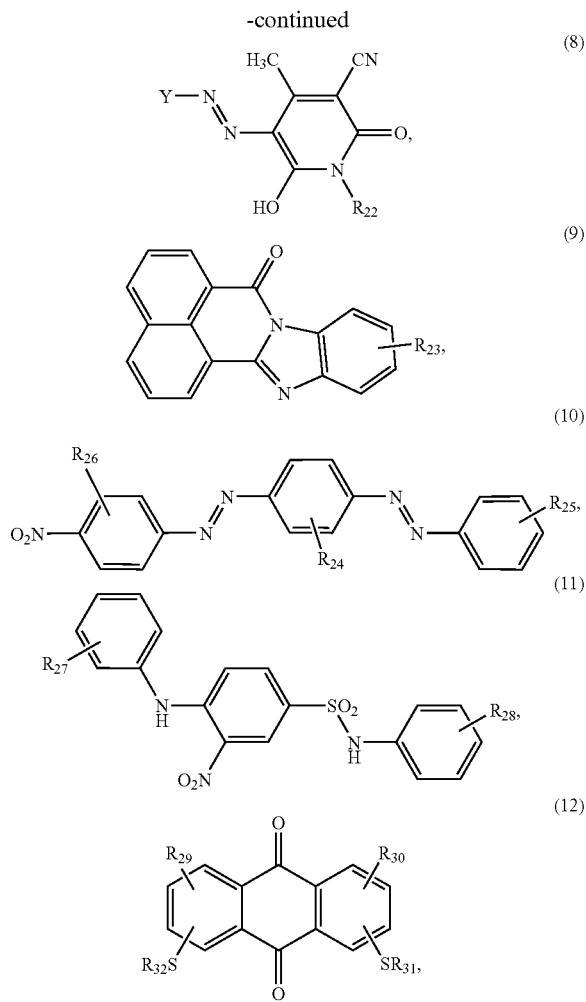

wherein $R_6$ is $C_1$-$C_{12}$alkyl, or $C_2$-$C_{12}$alkyl interrupted by one or more oxygen atoms and/or —COO-groups and $R_7$, $R_8$, $R_9$ and $R_{10}$, each independently of the others, is hydrogen, $C_1$-$C_{12}$alkyl, chlorine, bromine, hydroxy or amino, with the proviso that the radical $R_6$ in formula (2) is different from the radical $R_1$ in formula (1), X is the radical of a coupling component from the benzene, indene or carbazole series, $R_{11}$ and $R_{12}$, each independently of the other, is Cl, Br, $CF_3$ or CN, $R_{13}$ is $C_1$-$C_{12}$alkyl, $C_5$-$C_{24}$aryl or $C_6$-$C_{30}$aralkyl, $R_{14}$ is H, Cl, Br or $C_1$-$C_{12}$alkyl, $R_{15}$ and $R_{16}$, each independently of the other, is H, Cl, Br, $C_1$-$C_{12}$alkyl, $C_1$-$C_{12}$alkoxy or —COOR$_{33}$, wherein $R_{33}$ is $C_1$-$C_{12}$alkyl or $C_1$-$C_{12}$alkoxy-$C_1$-$C_{12}$alkyl, $R_{17}$ is $C_1$-$C_{12}$alkyl or $C_1$-$C_{12}$alkoxy-$C_1$-$C_{12}$alkyl, $R_{18}$ and $R_{19}$, each independently of the other, is H, Cl, Br, $C_1$-$C_{12}$alkyl, $C_1$-$C_{12}$alkoxy or —COOR$_{33}$, wherein $R_{33}$ is as defined hereinabove, $R_{20}$ and $R_{21}$, each independently of the other, is H, Cl, Br, $CF_3$ or CN or $R_{20}$ and $R_{21}$, together form a six-membered aromatic or cycloaliphatic ring, Y is the radical of a diazo component of the benzene, naphthalene, diphenyl, azobenzene, thiophene, benzothiazole, benzisothiazole, thiadiazole, indazole, benzotriazole, pyrazole, chromone, phthalimide or diphenylene oxide series, $R_{22}$ is H, $C_1$-$C_{12}$alkyl or $C_1$-$C_{12}$alkoxy-$C_1$-$C_{12}$alkyl, $R_{23}$ is H, Cl, Br, $C_1$-$C_{12}$alkyl, $C_1$-$C_{12}$alkoxy or —COOR$_{33}$, wherein $R_{33}$ is as defined hereinabove, $R_{24}$, $R_{25}$ and $R_{26}$, each independently of the other, is H, Cl, Br, OH, $C_1$-$C_{12}$alkyl, $C_1$-$C_{12}$alkoxy or —COOR$_{33}$, wherein $R_{33}$ is as defined hereinabove, $R_{27}$ and $R_{28}$, each independently of the other, is H, Cl, Br or $C_1$-$C_{12}$alkyl, $R_{29}$ and $R_{30}$, each independently of the other, is H, Cl, Br, OH, $C_1$-$C_{12}$alkyl, $C_1$-$C_{12}$alkoxy or —COOR$_{33}$, wherein $R_{33}$ is as defined hereinabove, and $R_{31}$ and $R_{32}$ are $C_1$-$C_{12}$alkyl, $C_5$-$C_{24}$aryl or $C_6$-$C_{30}$aralkyl, the sum of components (A)+(B) being 100% by weight.

The dyes of formulae (1) and (2) are known, for example, from EP-A 43 937.

Any of the radicals in formulae (1)-(12) that are alkyl may be straight-chain or branched radicals.

Examples are methyl, ethyl, n-propyl, isopropyl, n-butyl, isobutyl, sec-butyl, tert-butyl, n-pentyl, neopentyl, n-hexyl, 2-ethylhexyl, n-heptyl, n-octyl, n-nonyl, n-decyl and n-dodecyl.

Alkoxy radicals, too, may be straight-chain or branched. Examples of suitable alkoxy radicals are methoxy, ethoxy, n-propoxy, isopropoxy, tert-butoxy, n-pentyloxy, n-hexyloxy and n-decyloxy.

Aryl radicals are, for example, phenyl, tolyl, mesityl, isityl, naphthyl and anthryl.

Suitable aralkyl groups are, for example, benzyl and 2-phenylethyl.

$C_2$-$C_{12}$Alkyl interrupted by one or more oxygen atoms and/or —COO-groups is, for example, 2-methoxyethyl, 2-ethoxyethyl, 2-(2-ethoxyethoxy)ethyl,
—$CH_2CH_2OCH_2CH_2OCH_3$,
—$CH_2CH_2OCH_2CH_2OCH_2CH_2OCH_3$,
—$CH_2CH_2OCH_2CH_2OCH_2CH_2OC_2H_5$,
—$CH_2CH_2OCH_2CH_2OCH_2CH_2OCH_3$,
—$CH_2CH_2OCH_2CH_2OCH_2CH_2OC_2H_5$,
—$CH_2CH_2COOCH_3$, —$CH_2CH_2COOC_2H_5$,
—$CH_2CH_2CH_2CH_2COOCH_3$,
—$CH_2CH_2CH_2CH_2COOC_2H_5$,
—$CH_2CH_2OCH_2CH_2COOCH_3$ or
—$CH_2CH_2OCH_2CH_2COOC_2H_5$.

Dye mixtures according to the invention to which preference is given comprise, as component (A), a compound of formula (1a)

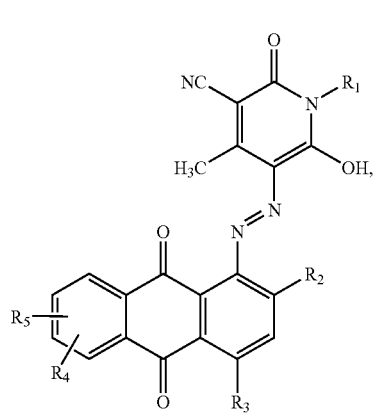

wherein $R_2$ and $R_3$ are identical and are each hydrogen, chlorine or bromine and $R_1$, $R_4$ and $R_5$ are as defined hereinabove.

Preference is given also to dye mixtures that comprise, as component (B), a compound of formula (2a)

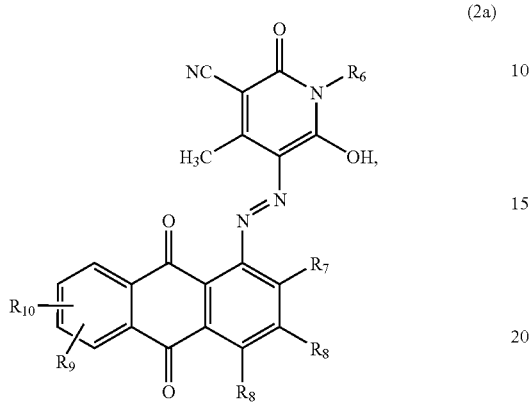
(2a)

wherein $R_7$ and $R_8$ are identical and are each hydrogen, chlorine or bromine and $R_6$, $R_9$ and $R_{10}$ are as defined hereinabove.

Preferred components A are compounds of formula (1) wherein $R_4$ and $R_5$ are hydrogen or chlorine.

Preferred components B are compounds of formula (2) wherein $R_9$ and $R_{10}$ are hydrogen or chlorine.

Preference is given also to dye mixtures that comprise, as component (A), a compound of formula (1) wherein $R_1$ is ethyl, n-propyl, n-butyl, isobutyl, n-hexyl, 2-ethylhexyl or 3-isopropoxypropyl and $R_2$, $R_3$, $R_4$ and $R_5$ are as defined hereinabove.

Preference is given furthermore to dye mixtures that comprise, as component (B), a compound of formula (2) wherein $R_6$ is ethyl, n-propyl, n-butyl, isobutyl, n-hexyl, 2-ethylhexyl or 3-isopropoxypropyl and $R_7$, $R_8$, $R_9$ and $R_{10}$ are as defined hereinabove.

Suitable components (A) or (B) are, for example, the compounds of formulae (101) to (127):

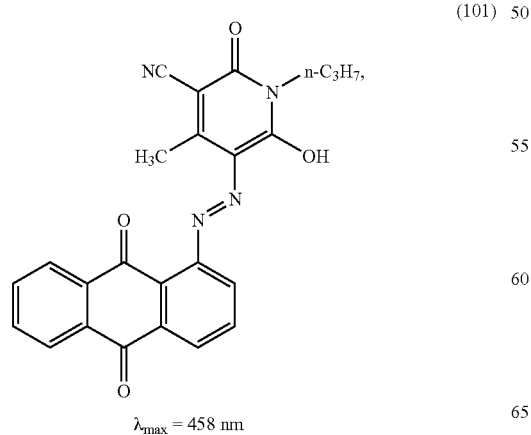
(101)

$\lambda_{max} = 458$ nm

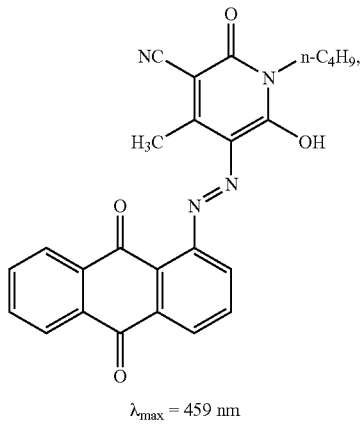
(102)

$\lambda_{max} = 459$ nm

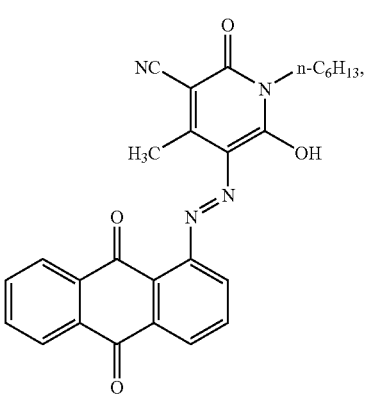
(103)

$\lambda_{max} = 461$ nm

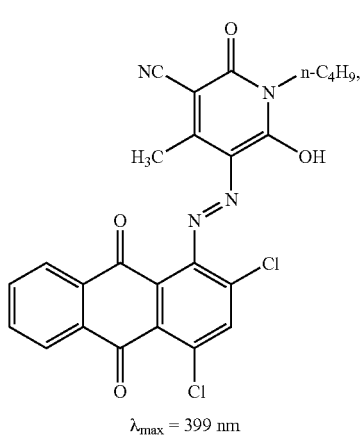
(104)

$\lambda_{max} = 399$ nm

-continued
(105)
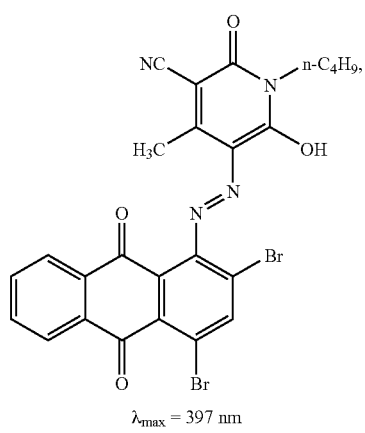
λmax = 397 nm
(106)
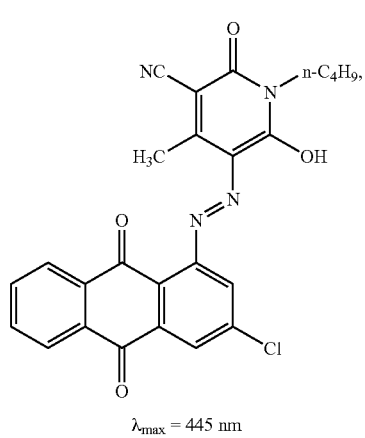
λmax = 445 nm
(107)
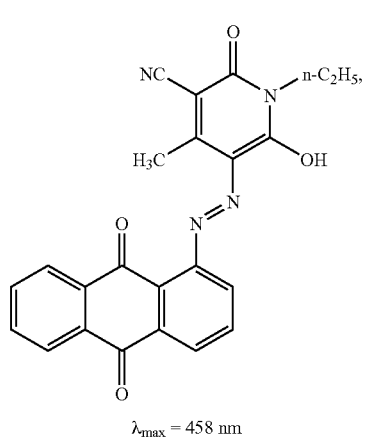
λmax = 458 nm
-continued
(108)
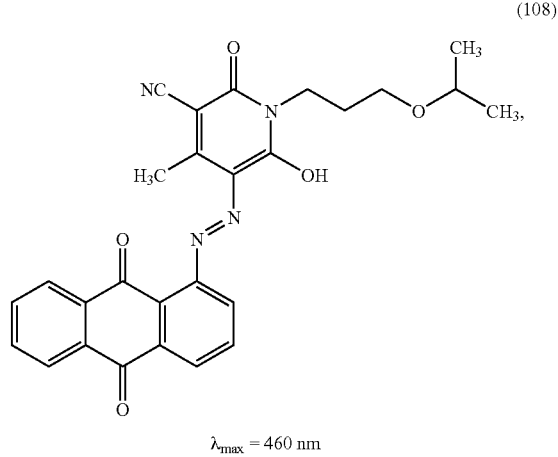
λmax = 460 nm
(109)
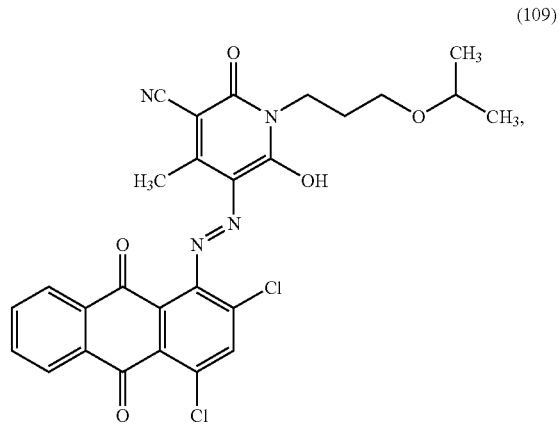
λmax = 400 nm
(110)
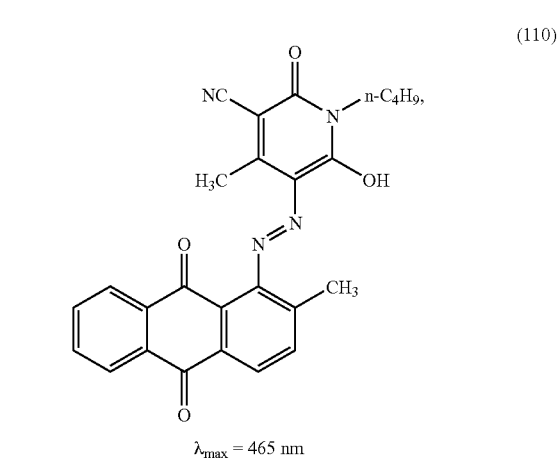
λmax = 465 nm -continued
(111)
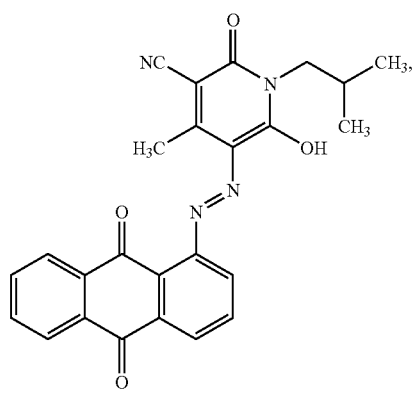
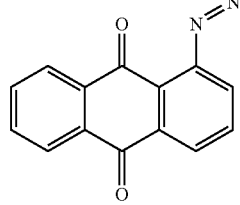
λ$_{max}$ = 458 nm
(112)
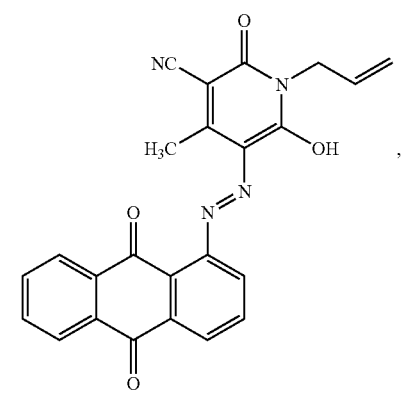
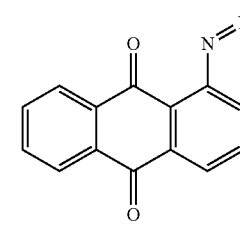
λ$_{max}$ = 457 nm
(113)
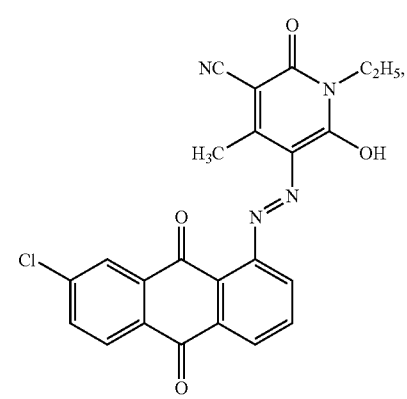
λ$_{max}$ = 465 nm
-continued
(114)
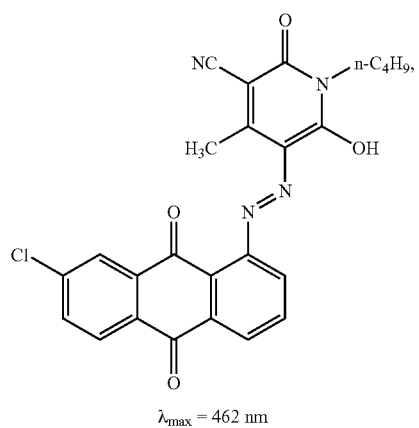
λ$_{max}$ = 462 nm
(115)
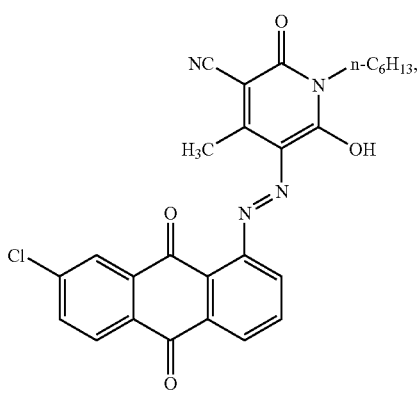
λ$_{max}$ = 458 nm
(116)
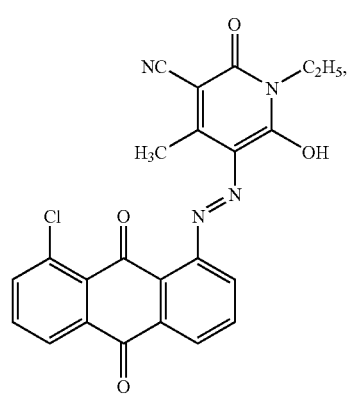
λ$_{max}$ = 456 nm -continued
(117)
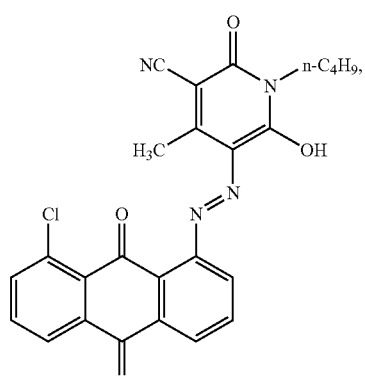
λ_max = 456 nm
(118)
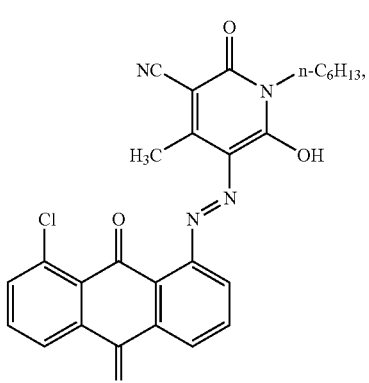
λ_max = 456 nm
(119)
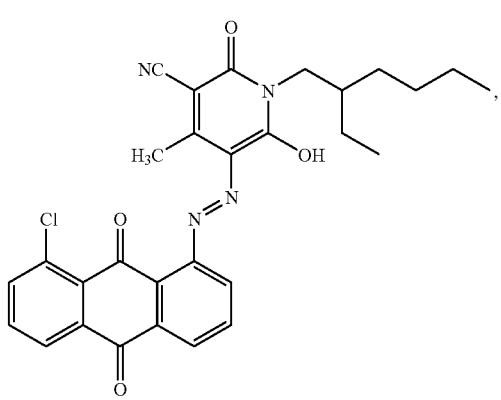
λ_max = 456 nm
-continued
(120)
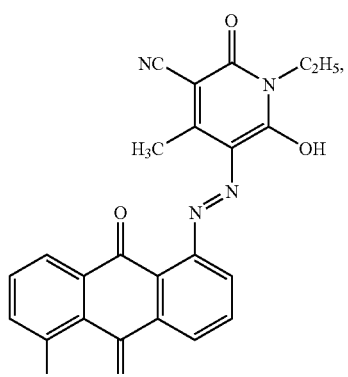
λ_max = 461 nm
(121)
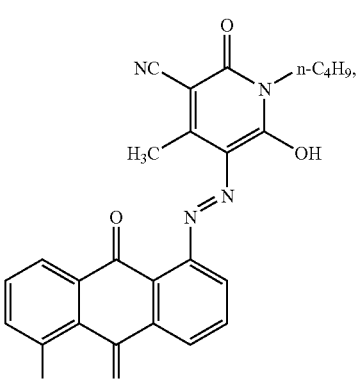
λ_max = 460 nm
(122)
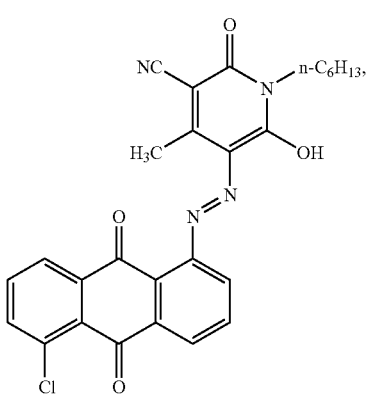
λ_max = 458 nm -continued
(123)
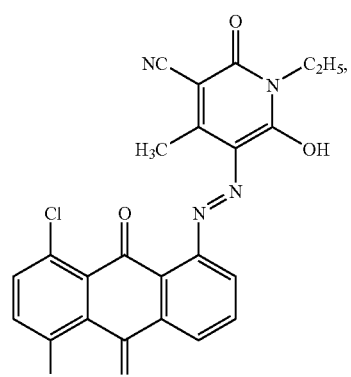
λ<sub>max</sub> = 458 nm
(124)
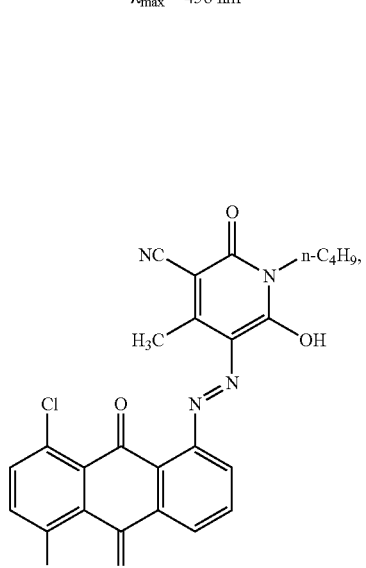
λ<sub>max</sub> = 454 nm
(125)
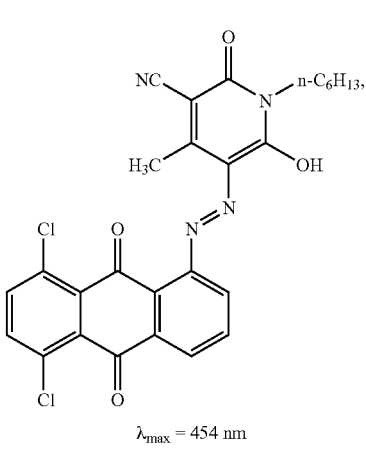
λ<sub>max</sub> = 454 nm
-continued
(126)
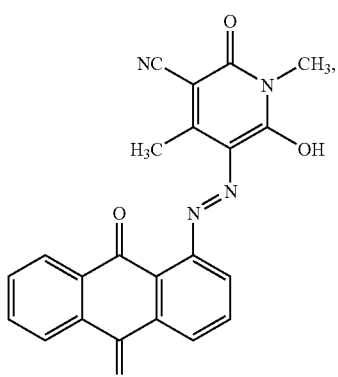
λ<sub>max</sub> = 459 nm
(127)
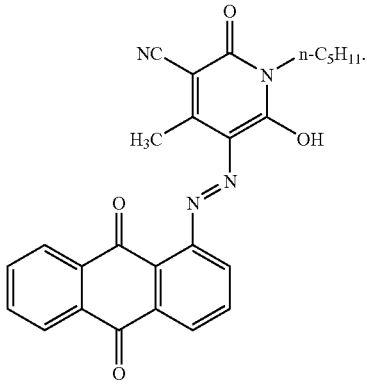
λ<sub>max</sub> = 458 nm
The dye mixtures according to the invention comprise preferably two or three, especially two, different dyes of formula (2).
Preferred as component (A) is the compound of formula (101)
(101)
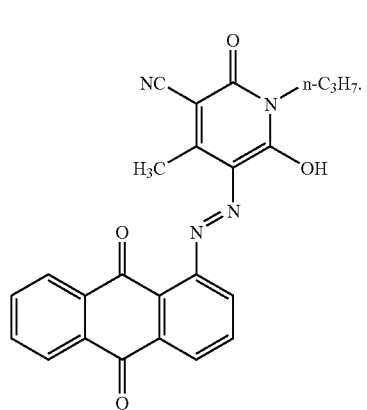

Dye mixtures to which preference is given comprise, as component (B), the compound of formula (102) and/or the compound of formula (103)

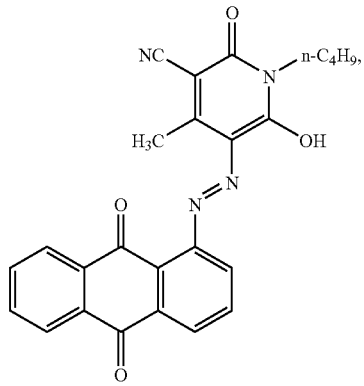
(102)

from 10 to 60% by weight, preferably from 20 to 50% by weight, especially from 25 to 40% by weight, of the compound of formula (102)

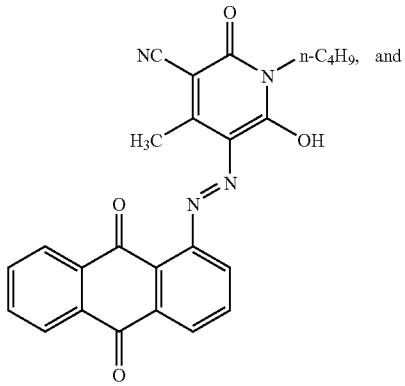
(102)

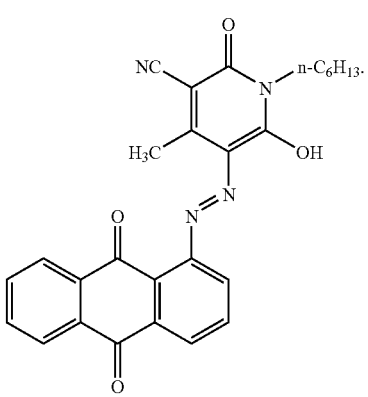
(103)

from 10 to 60% by weight, preferably from 20 to 50% by weight, especially from 25 to 40% by weight, of the compound of formula (103)

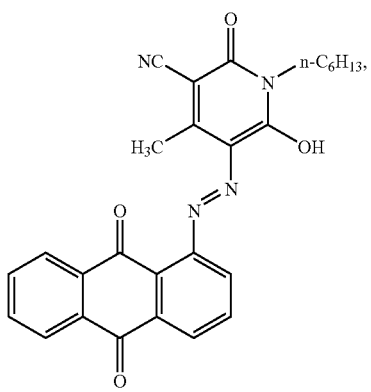
(103)

Special preference is given to dye mixtures that contain from 20 to 80% by weight, preferably from 25 to 60% by weight, especially from 30 to 50% by weight, of the compound of formula (101)

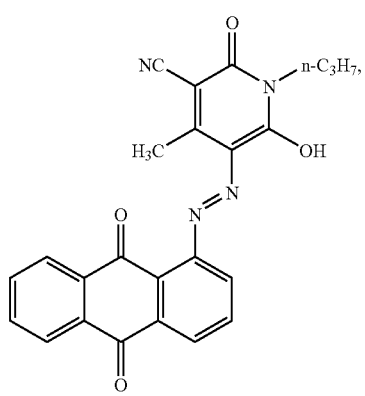
(101)

the sum of the compounds of formulae (101), (102) and (103) always being 100% by weight.

The dye mixtures according to the invention can also advantageously be used with other orange, yellow or brown dyes.

The amount of dye other than the compounds of formulae (1) and (2) is advantageously from 1 to 50% by weight, preferably from 5 to 40% by weight and especially from 10 to 30% by weight, based on the total amount of the dyes.

Preference is given to compounds of formula (3), wherein X is the radical

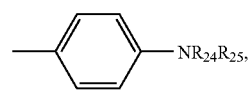

wherein $R_{24}$ and $R_{25}$ are 2-cyanoethyl or 2-acetoxyethyl.

Examples of suitable dyes of formulae (3) to (12) are C.I. Disperse Yellow 163, C.I. Disperse Orange 157, C.I. Disperse Orange 30, C.I. Disperse Orange 155, Dianix Yellow Brown AM-R, Dianix Yellow Brown KIS-M, C.I. Disperse Yellow 51, C.I. Disperse Yellow 65, C.I. Disperse Yellow 64, C.I. Disperse Yellow 149, Dianix Yellow AM-SLR, Dianix Orange AM-SLR, C.I. Solvent Brown 53, C.I. Solvent Yellow 97, C.I. Pigment Orange 70, C.I. Disperse Yellow 114, C.I. Disperse Yellow 71, C.I. Disperse Orange 29, C.I. Disperse Yellow 42, Disperse Yellow 86 and C.I. Solvent Yellow 163.

The dye mixtures according to the invention can be prepared in customary manner by blending the components with the aid of known mixing apparatuses (e.g. stirrers, rollers).

The dye mixtures according to the invention can be used in the dyeing and printing of semi-synthetic and, especially, synthetic hydrophobic fibre materials, especially textile materials. Textile materials of fabric blends that comprise such semi-synthetic or synthetic hydrophobic textile materials can likewise be dyed or printed using the dye mixtures according to the invention.

Semi-synthetic textile materials that come into consideration are especially cellulose 2½ acetate and cellulose triacetate.

Synthetic hydrophobic textile materials consist especially of linear, aromatic polyesters, for example polyesters of terephthalic acid and glycols, especially ethylene glycol, or condensation products of terephthalic acid and 1,4-bis(hydroxymethyl)cyclohexane; of polycarbonates, e.g. polycarbonates obtained from $\alpha,\alpha$-dimethyl-4,4'-dihydroxy-diphenyl-methane and phosgene, and of fibres based on polyvinyl chloride and on polyamide.

The dye mixtures according to the invention can be applied to the textile materials according to known dyeing methods. For example, polyester fibres materials are dyed in the exhaust method from aqueous dispersion in the presence of customary anionic or non-ionic dispersants and, optionally, customary swelling agents (carriers) at temperatures of from 80 to 140° C. Cellulose 2½ acetate is preferably dyed at from approximately 65 to 85° C. and cellulose triacetate at temperatures up to 115° C. The dye mixtures according to the invention are also suitable for use in the dyeing of polyester blends, such as, for example, polyester/cellulose fibre blends.

The dye mixtures according to the invention are suitable for dyeing in accordance with the thermosol method, in the exhaust and continuous method, and for printing processes. The exhaust method is preferred. The liquor ratio depends on the apparatus parameters, on the substrate and on the make-up, but can be selected from within a wide range, for example from 1:4 to 1:100; it is preferably, however, in the range from 1:6 to 1:25.

The said textile material can be in a variety of processing forms, such as, for example, in the form of fibres, yarns or non-wovens, in the form of woven fabrics or knitted fabrics.

It is advantageous to convert the dye mixtures according to the invention into a dye preparation prior to use. For that purpose, the dyes are so ground that their particle size is on average from 0.1 to 10 microns. Grinding may be carried out in the presence of dispersants. For example, the dried dye is ground with a dispersant or is kneaded into paste form with a dispersant and then dried in vacuo or by atomisation. The preparations so obtained can be used, after the addition of water, to prepare printing pastes and dye baths.

For printing, the customary thickeners will be used, e.g. modified or unmodified natural products, for example alginates, British gum, gum arabic, crystal gum, carob flour, tragacanth, carboxymethyl cellulose, hydroxyethyl cellulose, starch or synthetic products, for example polyacrylamides, polyacrylic acid or copolymers thereof, or polyvinyl alcohols. The dye mixtures according to the invention impart to the mentioned materials, especially to the polyester material, level colour shades having high tinctorial strength and very good in-use fastness properties, such as, especially, good fastness to light, especially very good high-temperature light fastness.

Especially good fastness-to-light properties can be achieved when the dye mixtures according to the invention additionally comprise UV absorbers.

The dye mixtures according to the invention can also readily be used together with other dyes to produce mixed shades.

The dye mixtures according to the invention are furthermore also suitable for dyeing hydrophobic fibre materials from supercritical $CO_2$.

The present invention relates also to the above-mentioned use of the dye mixtures according to the invention and to a method of dyeing or printing semi-synthetic or synthetic hydrophobic fibre materials, especially textile materials, which comprises applying a dye mixture according to the invention to the said materials or incorporating it therein. The mentioned hydrophobic fibre materials are preferably textile polyester materials. Further substrates that can be treated by the process according to the invention and also preferred process conditions can be found hereinabove in the more detailed explanation of the use of the dye mixtures according to the invention.

The following Examples serve to illustrate the invention. Unless otherwise indicated, parts are parts by weight and percentages are percentages by weight. The temperatures are given in degrees Celsius. The relationship between parts by weight and parts by volume is the same as that between grams and cubic centimetres.

EXAMPLE 1

100 g of polyester fabric are immersed at room temperature, at a liquor ratio of 1:20, in a liquor containing 0.5 g of the dye mixture comprising the azo dyes of formula (104), (107) and (108) in a ratio of 1:1:1, 1 g/l of ammonium sulfate and 0.5 g/l of a commercial levelling agent, the liquor having been adjusted to a pH value of from 4.5 to 5 using 80% formic acid. The liquor is then heated first at a heating rate of 3° C./minute to 60° C. and then at a heating rate of 2° C./minute to 135° C.

At 135° C., dyeing is carried out for 60 minutes. The liquor is then cooled to 40° C., and the dyed polyester fabric is washed with water and cleaned reductively at from 70 to 80° C., for 20 minutes, in a bath containing 5 ml/l of 30% sodium hydroxide solution, 2 g/l of 85% sodium dithionite solution and 1 g/l of a commercial detergent. The finished dyeing is then washed with water and dried.

A tinctorially strong lemon-yellow dyeing having good allround fastness properties, especially high-temperature light fastness properties that are excellent, is obtained.

EXAMPLE 2

100 g of polyester fabric are immersed at room temperature, at a liquor ratio of 1:20, in a liquor containing 0.6 g of the dye mixture comprising the azo dyes of formulae (101), (102) and (103) in a ratio of 1:1:1, 1 g/l of ammonium sulfate and 0.5 g/l of a customary levelling agent, the liquor having been adjusted to a pH value of from 4.5 to 5 using 80% formic acid. The liquor is then heated first at a heating rate of 3° C./minute to 60° C. and then at a heating rate of 2° C./minute to 135° C.

At 135° C., dyeing is carried out for 60 minutes. The liquor is then cooled to 40° C., and the dyed polyester fabric is washed with water and cleaned reductively at from 70 to 80° C., for 20 minutes, in a bath containing 5 ml/l of 30% sodium hydroxide solution, 2 g/l of 85% sodium dithionite solution and 1 g/l of a commercial detergent. The finished dyeing is then washed with water and dried.

A tinctorially strong yellow dyeing having good allround fastness properties, especially high-temperature light fastness properties that are excellent, is obtained.

EXAMPLE 3

100 g of polyester fabric are immersed at room temperature, at a liquor ratio of 1:20, in a liquor containing 0.5 g of the dye mixture comprising the azo dyes of formulae (108) and (109) in a ratio of 30:70, 1 g/l of ammonium sulfate and 0.5 g/l of a customary levelling agent, the liquor having been adjusted to a pH value of from 4.5 to 5 using 80% formic acid. The liquor is then heated first at a heating rate of 3° C./minute to 60° C. and then at a heating rate of 2° C./minute to 135° C.

At 135° C., dyeing is carried out for 60 minutes. The liquor is then cooled to 40° C., and the dyed polyester fabric is washed with water and cleaned reductively at from 70 to 80° C., for 20 minutes, in a bath containing 5 ml/l of 30% sodium hydroxide solution, 2 g/l of 85% sodium dithionite solution and 1 g/l of a commercial detergent. The finished dyeing is then washed with water and dried.

A tinctorially strong yellow dyeing having good allround fastness properties, especially high-temperature light fastness properties that are excellent, is obtained.

EXAMPLE 4

100 g of polyester fabric are immersed at room temperature, at a liquor ratio of 1:20, in a liquor containing 0.7 g of the dye mixture comprising the azo dyes of formulae (101), (102), (103) and C.I. Solvent Yellow 163 in a ratio of 10:20:20:50, 1 g/l of ammonium sulfate and 0.5 g/l of a customary levelling agent, the liquor having been adjusted to a pH value of from 4.5 to 5 using 80% formic acid. The liquor is then heated first at a heating rate of 3° C./minute to 60° C. and then at a heating rate of 2° C./minute to 135° C.

At 135° C., dyeing is carried out for 60 minutes. The liquor is then cooled to 40° C., and the dyed polyester fabric is washed with water and cleaned reductively at from 70 to 80° C., for 20 minutes, in a bath containing 5 ml/l of 30% sodium hydroxide solution, 2 g/l of 85% sodium dithionite solution and 1 g/l of a commercial detergent. The finished dyeing is then washed with water and dried.

A tinctorially strong yellow dyeing having good allround fastness properties, especially high-temperature light fastness properties that are excellent, is obtained.

EXAMPLES 5 TO 41

A polyester fabric is dyed with the dye mixtures indicated in Tables 1 and 2 in the manner described in Example 1. The amounts of dye are indicated in % by weight in Tables 1 and 2, the sum of the amounts of all dyes being in each case 100% by weight.

A tinctorially strong yellow dyeings having good allround fastness properties, especially high-temperature light fastness properties that are excellent, are obtained.

TABLE 1

| Example | 5 | 6 | 7 | 8 | 9 | 10 | 11 | 12 | 13 |
|---|---|---|---|---|---|---|---|---|---|
| Compound of formula (101) | 25 | 35 | 25 | 25 |  | 25 |  | 25 | 25 |
| Compound of formula (102) | 25 | 35 |  | 25 | 33 | 25 |  | 25 | 25 |
| Compound of formula (103) | 25 |  |  | 25 | 33 | 25 | 25 | 25 | 25 |
| Compound of formula (107) |  |  | 25 |  |  |  |  |  |  |
| Compound of formula (108) |  | 30 |  |  |  |  |  |  |  |
| Compound of formula (126) |  |  | 50 |  |  |  |  |  |  |
| Compound of formula (127) |  |  |  | 25 | 33 |  |  | 25 |  |
| C.I. Solvent Yellow 163 | 25 |  |  |  |  |  |  | 50 |  |
| C.I. Disperse Orange 157 |  |  |  |  |  |  | 25 |  |  |
| C.I. Disperse Yellow 51 |  |  |  |  |  |  |  |  |  |
| C.I. Disperse Yellow 42 |  |  |  |  |  |  |  |  | 25 |
| C.I. Solvent Brown 59 |  |  |  |  |  |  |  |  | 25 |
| C.I. Pigment Orange 70 |  |  |  |  |  |  |  |  |  |
| Dianix Yellow AM-SLR |  |  |  |  |  |  |  |  |  |
| Dianix Orange AM-SLR |  |  |  |  |  |  |  |  |  |

| Example | 14 | 15 | 16 | 17 | 18 | 19 | 20 | 21 | 22 |
|---|---|---|---|---|---|---|---|---|---|
| Compound of formula (101) | 25 | 25 | 25 | 25 | 20 |  | 10 |  | 25 |
| Compound of formula (102) | 25 | 25 | 25 | 25 | 20 | 20 | 10 |  | 25 |
| Compound of formula (103) | 25 | 25 | 25 | 25 | 20 | 20 | 10 | 25 | 25 |
| Compound of formula (107) |  |  |  |  |  |  |  |  |  |
| Compound of formula (108) |  |  |  |  |  |  |  | 10 |  |
| Compound of formula (126) |  |  |  |  |  |  |  |  |  |
| Compound of formula (127) |  |  |  |  |  |  |  |  | 25 |
| C.I. Solvent Yellow 163 |  |  |  |  | 20 | 30 |  | 40 |  |
| C.I. Disperse Orange 157 |  |  |  |  |  |  |  |  |  |
| C.I. Disperse Yellow 51 |  |  |  | 25 | 20 |  |  | 25 |  |
| C.I. Disperse Yellow 42 |  |  |  |  |  | 30 |  |  |  |
| C.I. Solvent Brown 59 |  |  |  |  |  |  |  |  |  |
| C.I. Pigment Orange 70 | 25 |  |  |  |  |  |  |  |  |
| Dianix Yellow AM-SLR |  | 25 |  |  |  |  | 35 |  |  |
| Dianix Orange AM-SLR |  |  | 25 |  |  |  | 35 |  |  |

| Example | 23 | 24 | 25 | 26 | 27 | 28 | 29 | 30 |
|---|---|---|---|---|---|---|---|---|
| Compound of formula (101) |  | 10 |  |  |  |  |  |  |
| Compound of formula (102) |  | 40 |  |  |  |  |  |  |
| Compound of formula (103) | 25 | 20 | 50 |  |  |  |  |  |
| Compound of formula (107) |  | 10 |  | 50 | 50 | 50 |  |  |
| Compound of formula (108) |  |  | 50 |  |  |  |  |  |
| Compound of formula (126) | 25 |  |  |  |  |  | 30 | 20 |
| Compound of formula (127) |  | 20 |  |  |  |  |  |  |
| C.I. Solvent Yellow 163 | 25 |  |  | 50 |  |  | 30 |  |
| C.I. Disperse Orange 157 |  |  |  |  |  |  |  | 50 |
| C.I. Disperse Yellow 51 |  |  |  |  | 50 |  |  |  |
| C.I. Disperse Yellow 42 | 25 |  |  |  |  | 50 | 40 | 30 |
| C.I. Solvent Brown 59 |  |  |  |  |  |  |  |  |
| C.I. Pigment Orange 70 |  |  |  |  |  |  |  |  |
| Dianix Yellow AM-SLR |  |  |  |  |  |  |  | 35 |
| Dianix Orange AM-SLR |  |  |  |  |  |  |  | 35 |

TABLE 2

| Example | 31 | 32 | 33 | 34 | 35 | 36 | 37 | 38 | 39 | 40 | 41 |
|---|---|---|---|---|---|---|---|---|---|---|---|
| Comp. of formula (101) | 15 | 11 | 16 | 24 | 11 | 16 | 11 | 13 | 10 | 19 |  |
| Comp. of formula (102) | 15 | 11 | 16 | 24 | 11 | 16 | 11 | 13 | 10 |  | 15 |
| Comp. of formula (103) | 15 | 11 | 16 | 24 | 11 | 16 | 11 | 13 | 10 |  |  |
| Comp. of formula (115) |  |  |  |  |  |  |  |  |  | 19 |  |
| Comp. of formula (117) |  |  |  |  |  |  |  |  |  | 19 | 15 |
| Comp. of formula (122) |  |  |  |  |  |  |  |  |  |  | 15 |
| C.I. S YE 163 | 55 |  | 22 | 22 |  |  |  |  | 50 |  | 35 |
| C.I. DS YE 65 |  | 6 |  |  | 6 |  | 6 |  |  |  |  |
| C.I. DS YE 114 |  |  |  |  |  |  |  | 11 |  |  |  |

TABLE 2-continued

| Example | 31 | 32 | 33 | 34 | 35 | 36 | 37 | 38 | 39 | 40 | 41 |
|---|---|---|---|---|---|---|---|---|---|---|---|
| C.I. DS OR 157 |  | 25 | 24 |  |  | 46 |  | 11 |  | 16 |  |
| C.I. DS YE 42 |  | 42 |  |  | 57 |  | 56 |  | 70 | 27 |  |
| C.I. DS YE 64 |  |  |  |  | 10 |  |  |  |  |  |  |
| C.I. DS YE 51 |  |  |  |  |  |  |  |  |  |  | 20 |

What is claimed is:

1. A dye mixture comprising (A) from 20 to 80% by weight of one or more compounds of formula (1)

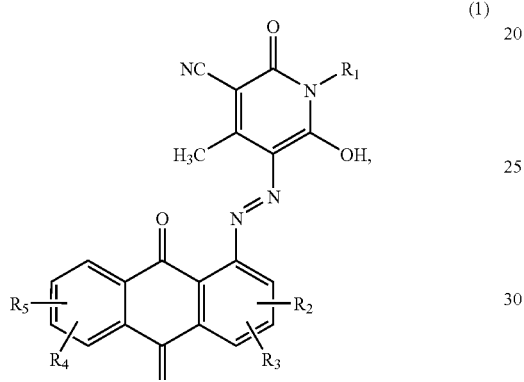

(1)

wherein $R_1$ is $C_1$-$C_{12}$ alkyl, or $C_2$-$C_{12}$ alkyl interrupted by one or more oxygen atoms and/or —COO— groups and $R_2$, $R_3$, $R_4$ and $R_5$, each independently of the others, is hydrogen, $C_1$-$C_{12}$ alkyl, chlorine, bromine, hydroxy or amino and (B) from 20 to 80% by weight of at least one compound of formulae (2)-(12)

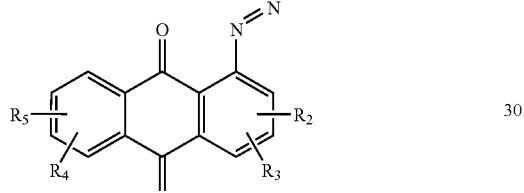

(2)

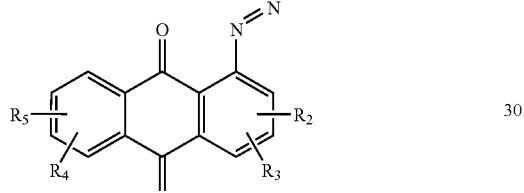

(3)

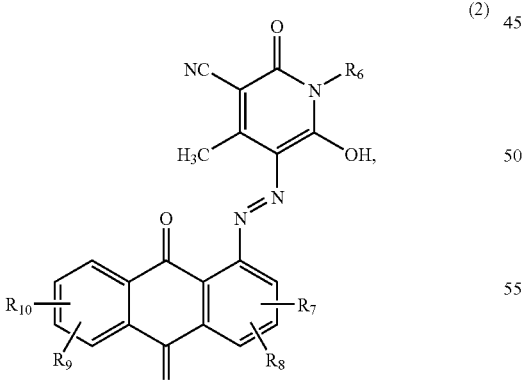

(4)

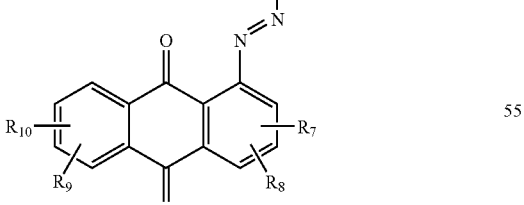

(5)

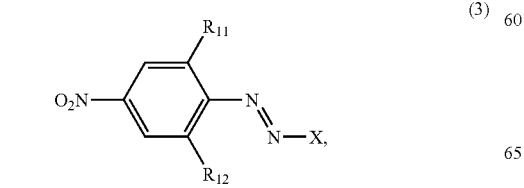

(6)

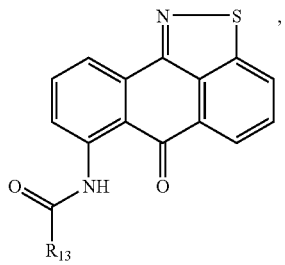

(7)

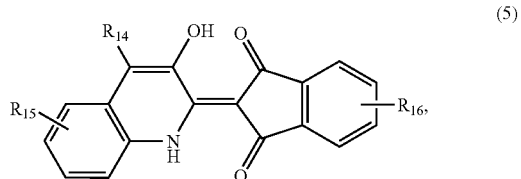

(8)

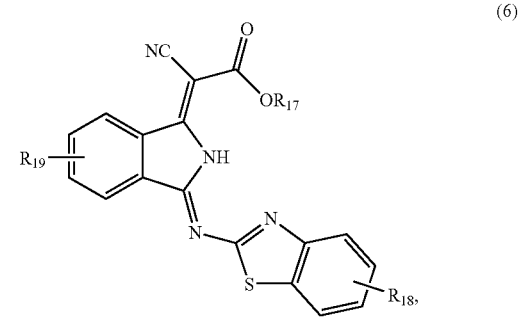

(9)

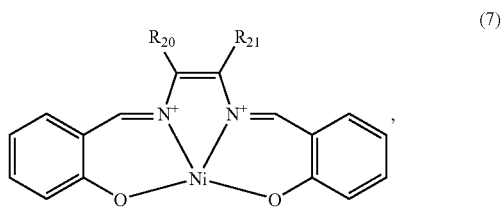

(10)

-continued

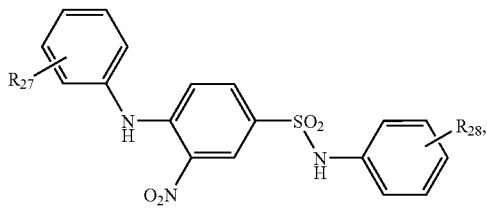
(11)

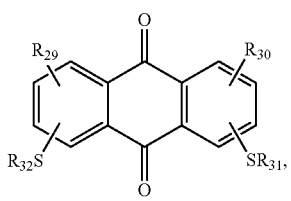
(12)

wherein $R_6$ is $C_1$-$C_{12}$ alkyl, or $C_2$-$C_{12}$ alkyl interrupted by one or more oxygen atoms and/or —COO— groups and $R_7$, $R_8$, $R_9$ and $R_{10}$, each independently of the others, is hydrogen, $C_1$-$C_{12}$ alkyl, chlorine, bromine, hydroxy or amino, with the proviso that the radical $R_6$ in formula (2) is different from the radical $R_1$ in formula (1), X is the radical of a coupling component from the benzene, indene or carbazole series, $R_{11}$ and $R_{12}$, each independently of the other, is Cl, Br, $CF_3$ or CN, $R_{13}$ is $C_1$-$C_{12}$ alkyl, $C_5$-$C_{24}$ aryl or $C_6$-$C_{30}$ aralkyl, $R_{14}$ is H, Cl, Br or $C_1$-$C_{12}$ alkyl, $R_{15}$ and $R_{16}$, each independently of the other, is H, Cl, Br, $C_1$-$C_{12}$ alkyl, $C_1$-$C_{12}$ alkoxy or —$COOR_{33}$, wherein $R_{33}$ is $C_1$-$C_{12}$ alkyl or $C_1$-$C_{12}$ alkoxy-$C_1$-$C_{12}$ alkyl, $R_{17}$ is $C_1$-$C_{12}$ alkyl or $C_1$-$C_{12}$ alkoxy-$C_1$-$C_{12}$ alkyl, $R_{18}$ and $R_{19}$, each independently of the other, is H, Cl, Br, $C_1$-$C_{12}$ alkyl, $C_1$-$C_{12}$ alkoxy or —$COOR_{33}$, wherein $R_{33}$ is as defined hereinabove, $R_{20}$ and $R_{21}$ are H, Cl, Br, $CF_3$ or CN or $R_{20}$ and $R_{21}$ together form a six-membered aromatic or cycloaliphatic ring, Y is the radical of a diazo component of the benzene, naphthalene, diphenyl, azobenzene, thiophene, benzothiazole, benzisothiazole, thiadiazole, indazole, benzotriazole, pyrazole, chromone, phthalimide or diphenylene oxide series, $R_{22}$ is H, $C_1$-$C_{12}$ alkyl or $C_1$-$C_{12}$ alkoxy-$C_1$-$C_{12}$ alkyl, $R_{23}$ is H, Cl, Br, $C_1$-$C_{12}$ alkyl, $C_1$-$C_{12}$ alkoxy or —$COOR_{33}$, wherein $R_{33}$ is as defined hereinabove, $R_{24}$, $R_{25}$ and $R_{26}$, each independently of the other, is H, Cl, Br, OH, $C_1$-$C_{12}$ alkyl, $C_1$-$C_{12}$ alkoxy or —$COOR_{33}$, wherein $R_{33}$ is as defined hereinabove, $R_{27}$ and $R_{28}$, each independently of the other, is H, Cl, Br or $C_1$-$C_{12}$ alkyl, $R_{29}$ and $R_{30}$, each independently of the other, is H, Cl, Br, OH, $C_1$-$C_{12}$ alkyl, $C_1$-$C_{12}$ alkoxy or —$COOR_{33}$, wherein $R_{33}$ is as defined hereinabove, and $R_{31}$ and $R_{32}$ are $C_1$-$C_{12}$ alkyl, $C_5$-$C_{24}$ aryl or $C_6$-$C_{30}$ aralkyl, the sum of components (A)+(B) being 100% by weight.

2. A dye mixture according to claim 1 comprising, as component (A), a compound of formula (1a)

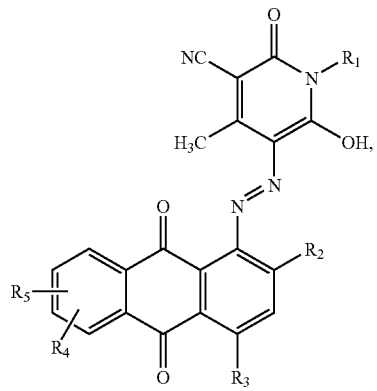
(1a)

wherein $R_2$ and $R_3$ are identical and are each hydrogen, chlorine or bromine and $R_1$, $R_4$ and $R_5$ are as defined in claim 1.

3. A dye mixture according to claim 1 comprising, as component (B), a compound of formula (2a)

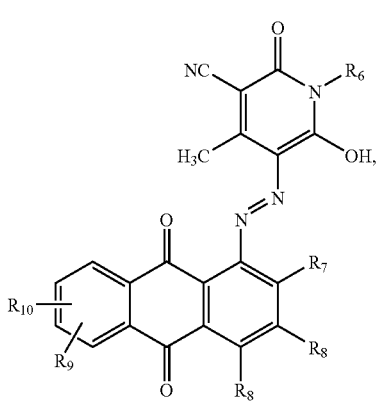
(2a)

wherein $R_7$ and $R_8$ are identical and are each hydrogen, chlorine or bromine and $R_6$, $R_9$ and $R_{10}$ are as defined in claim 1.

4. A dye mixture according to claim 1 comprising, as component (A), a compound of formula (1) wherein $R_4$ and $R_5$ are hydrogen or chlorine.

5. A dye mixture according to claim 1 comprising, as component (B), a compound of formula (2) wherein $R_9$ and $R_{10}$ are hydrogen or chlorine.

6. A dye mixture according to claim 1 comprising, as component (A), a compound of formula (1) wherein $R_1$ is ethyl, n-propyl, n-butyl, isobutyl, n-hexyl, 2-ethylhexyl or 3-isopropoxypropyl and $R_2$, $R_{3,\,1}$ and $R_5$ are as defined in claim 1.

7. A dye mixture according to claim 1 comprising, as component (B), a compound of formula (2), wherein $R_6$ is ethyl, n-propyl, n-butyl, isobutyl, n-hexyl, 2-ethyihexyl or 3-isopropoxypropyl and $R_7$, $R_8$, $R_9$ and $R_{10}$ are as defined in claim 1.

8. A dye mixture according to claim 1 comprising, as component (B), two or three different dyes of formula (2).

9. A dye mixture according to claim 1 comprising, as component (A), the compound of formula (101)

10. A dye mixture according to claim 1 comprising, as component (B), the compound of formula (102) and/or the compound of formula (103)

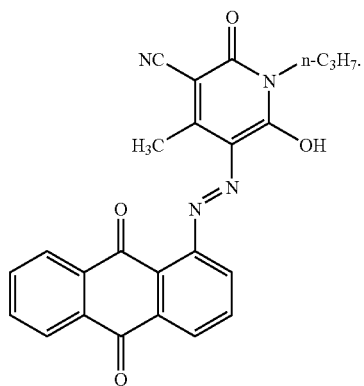
(101)

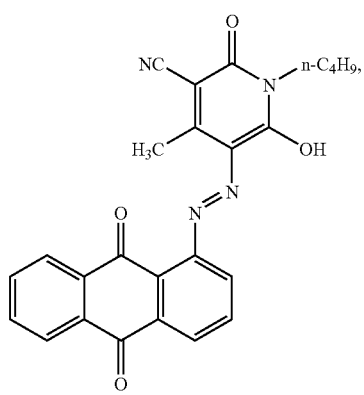
(102)

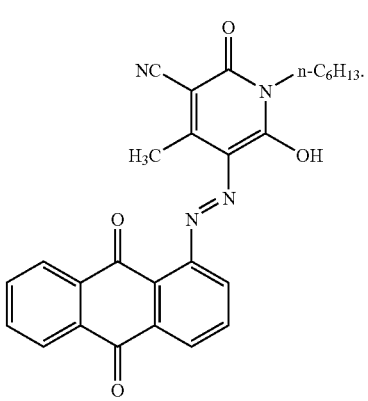
(103)

11. A dye mixture according to claim 1 comprising
from 20 to 80% by weight of the compound of formula (101)

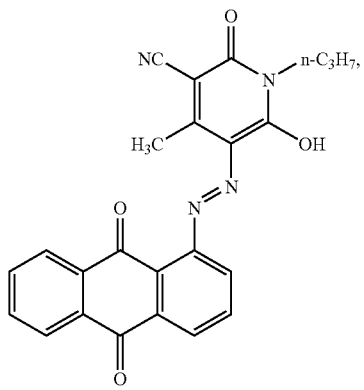
(101)

from 10 to 60% by weight of the compound of formula (102)

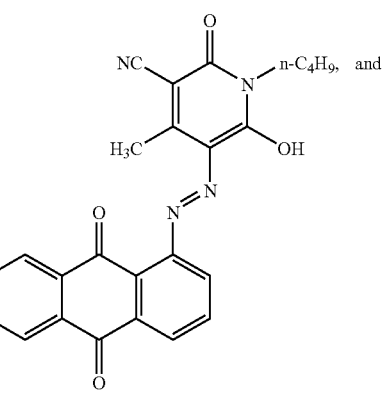
(102)

and from 10 to 60% by weight of the compound of formula (103)

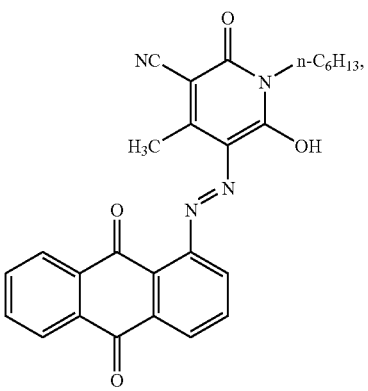
(103)

the sum of the compounds of formula (101), (102) and (103) always being 100% by weight.

12. A dye mixture according to claim 1 comprising, as component (B), at least one disperse dye of formula (2) and at least one disperse dye of formulae (3) to (12).

13. A method of dyeing or printing a semi-synthetic or synthetic hydrophobic fibre material comprising applying a dye mixture to the fibre material wherein the dye mixture comprises (A) from 20 to 80% by weight of one or more compounds of formula (1)

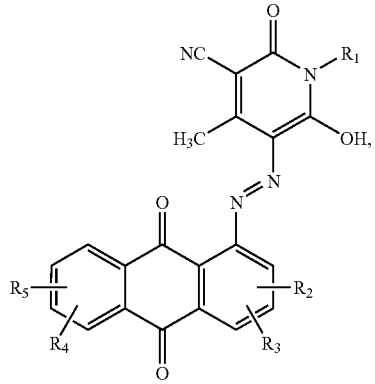
(1)

wherein $R_1$ is $C_1$-$C_{12}$ alkyl, or $C_2$-$C_{12}$ alkyl interrupted by one or more oxygen atoms and/or —COO— groups and $R_2$, $R_3$, $R_4$ and $R_5$, each independently of the others, is hydrogen, $C_1$-$C_{12}$ alkyl, chlorine, bromine, hydroxy or amino and (B) from 20 to 80% by weight of at least one compound of formulae (2)-(12)

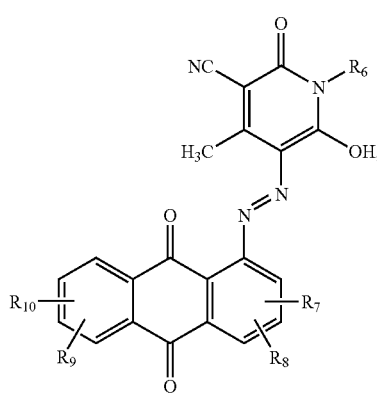
(2)

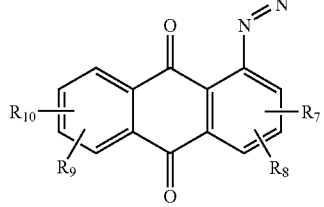
(3)

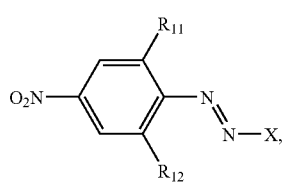
(4)

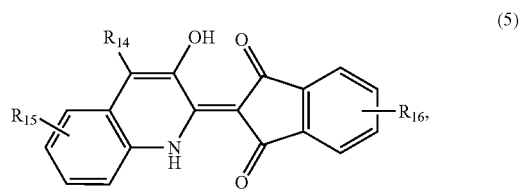
(5)

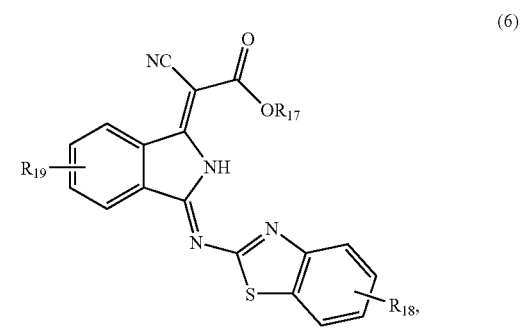
(6)

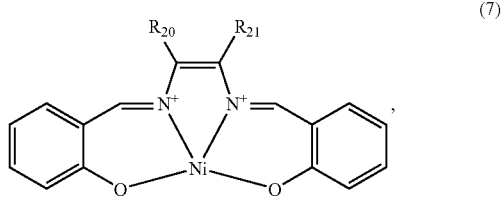
(7)

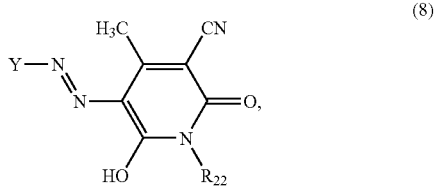
(8)

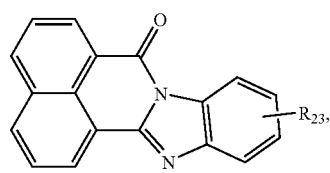
(9)

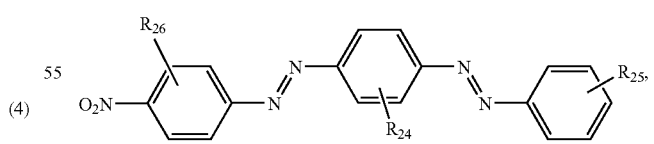
(10)

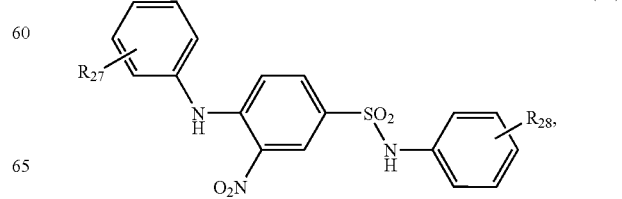
(11)

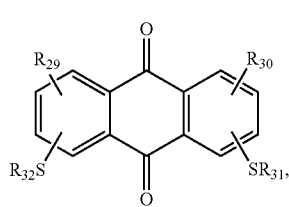
(12)

wherein $R_6$ is $C_1$-$C_{12}$ alkyl, or $C_2$-$C_{12}$ alkyl interrupted by one or more oxygen atoms and/or —COO— groups and $R_7$, $R_8$, $R_9$ and $R_{10}$, each independently of the others, is hydrogen, $C_1$-$C_{12}$ alkyl, chlorine, bromine, hydroxy or amino, with the proviso that the radical $R_6$ in formula (2) is different from the radical $R_1$ in formula (1), X is the radical of a coupling component from the benzene, indene or carbazole series, $R_{11}$ and $R_{12}$, each independently of the other, is Cl, Br, $CF_3$ or CN, $R_{13}$ is $C_1$-$C_{12}$ alkyl, $C_5$-$C_{24}$ aryl or $C_6$-$C_{30}$ aralkyl, $R_{14}$ is H, Cl, Br or $C_1$-$C_{12}$ alkyl, $R_{15}$ and $R_{16}$, each independently of the other, is H, Cl, Br, $C_1$-$C_{12}$ alkyl, $C_1$-$C_{12}$ alkoxy or —COOR$_{33}$, wherein $R_{33}$ is $C_1$-$C_{12}$ alkyl or $C_1$-$C_{12}$ alkoxy-$C_1$-$C_{12}$ alkyl, $R_{17}$ is $C_1$-$C_{12}$ alkyl or $C_1$-$C_{12}$ alkoxy-$C_1$-$C_{12}$ alkyl, $R_{18}$ and $R_{19}$, each independently of the other, is H, Cl, Br, $C_1$-$C_{12}$ alkyl, $C_1$-$C_{12}$ alkoxy or —COOR$_{33}$, wherein $R_{33}$ is as defined hereinabove, $R_{20}$ and $R_{21}$ are H, Cl, Br, $CF_3$ or CN or $R_{20}$ and $R_{21}$ together form a six-membered aromatic or cycloaliphatic ring, Y is the radical of a diazo component of the benzene, naphthalene, diphenyl, azobenzene, thiophene, benzothiazole, benzisothiazole, thiadiazole, indazole, benzotriazole, pyrazole, chromone, phthalimide or diphenylene oxide series, $R_{22}$ is H, $C_1$-$C_{12}$ alkyl or $C_1$-$C_{12}$ alkoxy-$C_1$-$C_{12}$ alkyl, $R_{23}$ is H, Cl, Br, $C_1$-$C_{12}$ alkyl, $C_1$-$C_{12}$ alkoxy or —COOR$_{33}$, wherein $R_{33}$ is as defined hereinabove, $R_{24}$, $R_{25}$ and $R_{26}$, each independently of the other, is H, Cl, Br, OH, $C_1$-$C_{12}$ alkyl, $C_1$-$C_{12}$ alkoxy or —COOR$_{33}$, wherein $R_{33}$ is as defined hereinabove, $R_{27}$ and $R_{28}$, each independently of the other, is H, Cl, Br or $C_1$-$C_{12}$ alkyl, $R_{29}$ and $R_{30}$, each independently of the other, is H, Cl, Br, OH, $C_1$-$C_{12}$ alkyl, $C_1$-$C_{12}$ alkoxy or —COOR$_{33}$, wherein $R_{33}$ is as defined hereinabove, and $R_{31}$ and $R_{32}$ are $C_1$-$C_{12}$ alkyl, $C_5$-$C_{24}$ aryl or $C_6$-$C_{30}$ aralkyl, the sum of components (A)+(B) being 100% by weight.

14. A semi-synthetic or synthetic hydrophobic fibre material dyed or printed according to the method of claim 13.

* * * * *